US011822589B2

(12) United States Patent
Singh et al.

(10) Patent No.: US 11,822,589 B2
(45) Date of Patent: Nov. 21, 2023

(54) METHOD AND SYSTEM FOR PERFORMING SUMMARIZATION OF TEXT (71) Applicant: L&T TECHNOLOGY SERVICES LIMITED, Chennai (IN)

(72) Inventors: Madhusudan Singh, Bangalore (IN); Aritra Ghosh Dastidar, Kolkata (IN); Vanapalli Venkata Nirmal Ramesh Rayulu, Visakhapatnam (IN)

(73) Assignee: L&T TECHNOLOGY SERVICES LIMITED, Chennai (IN)

(*) Notice: Subject to any disclaimer, the term of this patent is extended or adjusted under 35 U.S.C. 154(b) by 62 days.

(21) Appl. No.: 17/477,154

(22) Filed: Sep. 16, 2021

(65) Prior Publication Data
US 2022/0083579 A1    Mar. 17, 2022

(51) Int. Cl.
G06F 16/30    (2019.01)
G06F 16/34    (2019.01)
G06F 40/284   (2020.01)
G06F 18/22    (2023.01)
G06F 18/23213 (2023.01)

(52) U.S. Cl.
CPC ............ *G06F 16/345* (2019.01); *G06F 18/22* (2023.01); *G06F 18/23213* (2023.01); *G06F 40/284* (2020.01)

(58) Field of Classification Search
CPC ....... G06F 16/345; G06F 40/284; G06F 18/22
See application file for complete search history.

(56) References Cited

U.S. PATENT DOCUMENTS

| 7,305,336 | B2  | 12/2007 | Polanyi et al. |
| 8,527,262 | B2  | 9/2013  | Kambhatla et al. |
| 9,069,754 | B2  | 6/2015  | Kandekar et al. |
| 11,016,997 | B1* | 5/2021  | Huang ................. G06F 16/285 |
| 2017/0286970 | A1 | 10/2017 | Pelletier |
| 2018/0143980 | A1* | 5/2018 | Tanikella ............. G06F 16/285 |
| 2019/0026815 | A1* | 1/2019 | Zhou .................. G06Q 30/0203 |
| 2020/0143259 | A1 | 5/2020  | Lindsley |

(Continued)

OTHER PUBLICATIONS

Article entitled "Analysis of Clustering Techniques for Query Dependent Text Document Summarization", by Deshmukh et al.,, dated Mar. 2013 (Year: 2013).*

(Continued)

*Primary Examiner* — Mahesh H Dwivedi (57) ABSTRACT

In an embodiment, a method of performing summarization of text is disclosed. The method may include receiving an input text including a plurality of paragraphs and a user-query including one or more tokens. The method may further include segregating the input text into the plurality of paragraphs, creating a plurality of paragraph-vectors representative of the plurality of paragraphs, and clustering the plurality of paragraph-vectors to generate one or more clusters of paragraph-vectors. The method may further include determining a relevant cluster of paragraph-vectors from the one or more clusters of paragraph-vectors, based on a degree of similarity of each cluster of paragraph-vectors with the user-query. The relevant cluster of paragraph-vectors is representative of a set of relevant paragraphs from the input text. The set of relevant paragraphs corresponding to the relevant cluster of paragraph-vectors may be outputted.

15 Claims, 7 Drawing Sheets

(56) References Cited

U.S. PATENT DOCUMENTS

2021/0026750 A1\* 1/2021 Shukla .................. G06N 3/045
2023/0004589 A1\* 1/2023 Wu ...................... G06F 16/345

OTHER PUBLICATIONS

Article entitled "Multi-Document Summarization with Subjectivity Analysis at DUC 2005", by Seki et al., dated 2005 (Year: 2005).\*
Article entitled "The Weighted Word2vec Paragraph Vectors for Anomaly Detection over HTTP Traffic", by Li et al., dated Aug. 13, 2020 (Year: 2020).\*
Article entitled "Clustrophile 2: Guided Visual Clustering Analysis", by Cavello et al., dated Jan. 2019) (Year: 2019).\*
Pratibha Devihosur, Naseer R, Automatic Text Summarization Using Natural Language Processing, International Research Journal of Engineering and Technology (IRJET), Aug. 2017, (pp. 1434-1440), vol. 04 Issue: 08, M. Tech. student, Dept. of Computer Science and Engineering, B.I.E.T College, Karnataka, India.

\* cited by examiner

FIG. 5C ions, upon execution, may further cause the processor to create a plurality of paragraph-vectors. Each of the plurality of paragraph-vectors is representative of a paragraph of the plurality of paragraphs. The plurality of processor executable instructions, upon execution, may further cause the processor to cluster the plurality of paragraph-vectors to generate one or more clusters of paragraph-vectors, and determine a relevant cluster of paragraph-vectors from the one or more clusters of paragraph-vectors, based on a degree of similarity of each cluster of paragraph-vectors with the user input. The relevant cluster of paragraph-vectors is representative of a set of relevant paragraphs from the input text. The plurality of processor executable instructions, upon execution, may further cause the processor to output the set of relevant paragraphs corresponding to the relevant cluster of paragraph-vectors.

METHOD AND SYSTEM FOR PERFORMING SUMMARIZATION OF TEXT

TECHNICAL FIELD

This disclosure relates generally to text summarization, and more particularly to a method and a system for dynamically generating text summarization for an input text based on a user-query.

BACKGROUND

In today's fast-paced world, summarization of text plays a significant role in retrieving useful content from lengthy text documents (for example, manuals, e-books, etc.). Since these text documents contain multiple topics, it can be a difficult task to manually process these text documents to obtain relevant information from those text documents in a concise form.

Some automated techniques are known to be used for text summarization. For example, one technique includes summarizing the source text using concepts of graph theory. The source text is processed by structural analysis techniques to create a structural summarization. This structural summarization is further summarized by compressing portions of it that are inclined to generalization. However, since each instance needs to be up to date with the data from other instances, data exchange and its validity between the instances poses a challenge.

Therefore, a semantic-based solution for of dynamic summarization of an input text based on an input keyword (i.e. a user query) is desired.

SUMMARY OF THE INVENTION

In an embodiment, a method of performing summarization of text is disclosed. The method may include receiving an input text, wherein the input text comprises a plurality of paragraphs, and receiving a user-input comprising one or more tokens. The method may further include segregating the input text into the plurality of paragraphs. Each of the plurality of paragraphs may include a plurality of tokens. The method may further include creating a plurality of paragraph-vectors. Each of the plurality of paragraph-vectors is representative of a paragraph of the plurality of paragraphs. The method may further include clustering the plurality of paragraph-vectors to generate one or more clusters of paragraph-vectors, and determining a relevant cluster of paragraph-vectors from the one or more clusters of paragraph-vectors, based on a degree of similarity of each cluster of paragraph-vectors with the user input. The relevant cluster of paragraph-vectors is representative of a set of relevant paragraphs from the input text. The method may further include outputting the set of relevant paragraphs corresponding to the relevant cluster of paragraph-vectors.

In another embodiment, a system for performing summarization of text is disclosed. The system includes a processor and a memory configured to store a plurality of processor executable instructions. Upon execution by the processor, the plurality of processor executable instructions may cause the processor to receive an input text, wherein the input text comprises a plurality of paragraphs and receive a user-input comprising one or more tokens. The plurality of processor executable instructions, upon execution, may further cause the processor to segregate the input text into the plurality of paragraphs. Each of the plurality of paragraphs comprises a plurality of tokens. The plurality of processor executable instruct

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
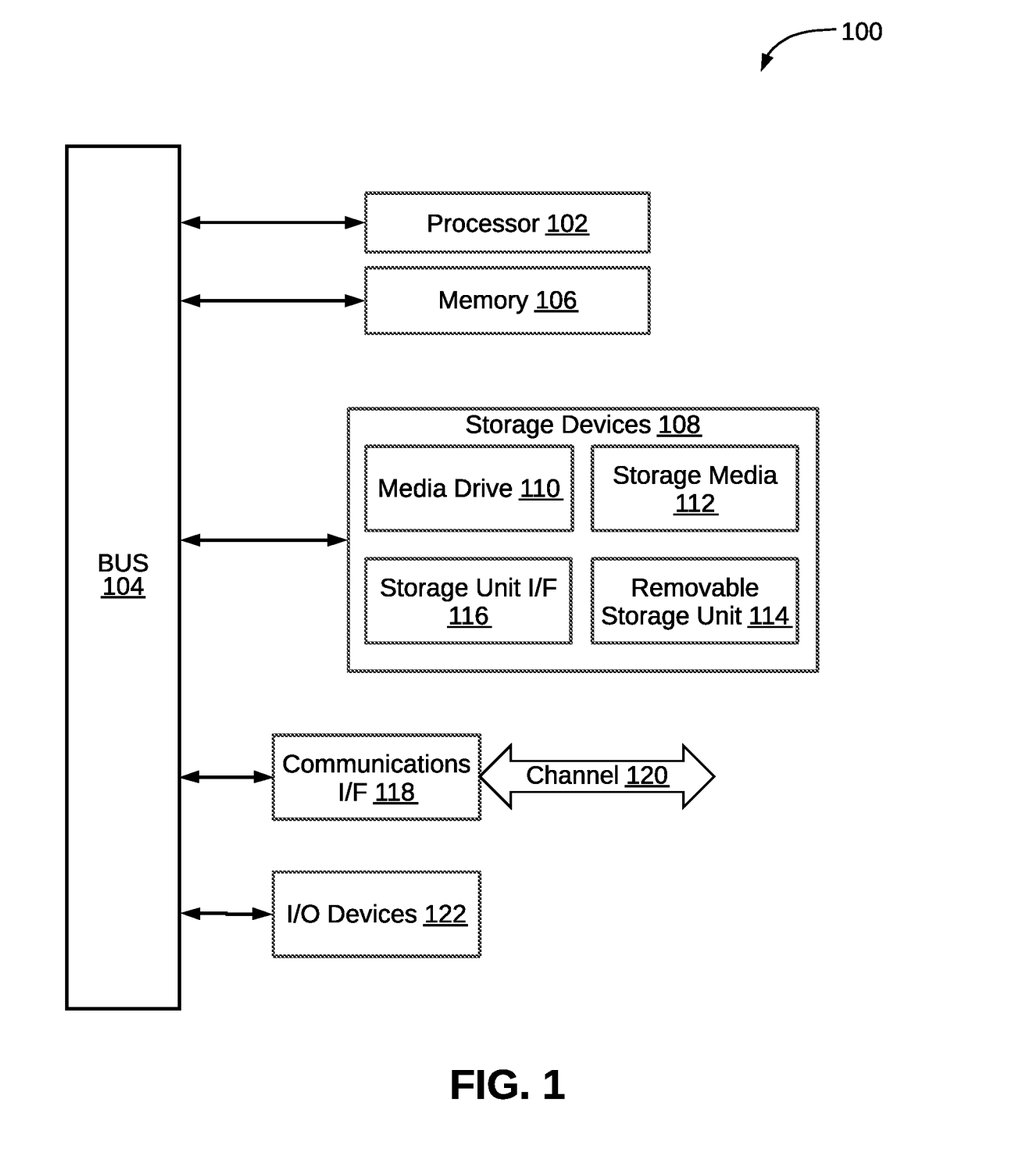
FIG. 1 is a block diagram of a computing system that may be employed to implement processing functionality for various embodiments.

Referring to FIG. 1, an exemplary computing system 100 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 100 may represent, for example, a user device such as a desktop, a laptop, a mobile phone, personal entertainment device, DVR, and so on, or any other type of special or general-purpose computing device as may be desirable or appropriate for a given application or environment. The computing system 100 may include one or more processors, such as a processor 102 that may be implemented using a general or special purpose processing engine such as, for example, a microprocessor, microcontroller, or other control logic. In this example, the processor 102 is connected to a bus 104 or other communication medium.

The computing system 100 may also include a memory 106 (main memory), for example, Random Access Memory (RAM) or other dynamic memory, for storing information and instructions to be executed by the processor 102. The memory 106 also may be used for storing temporary variables or other intermediate information during execution of instructions to be executed by the processor 102. The computing system 100 may likewise include a read only memory ("ROM") or other static storage device coupled to bus 104 for storing static information and instructions for the processor 102.

The computing system 100 may also include a storage devices 108, which may include, for example, a media drive 110 and a removable storage interface. The media drive 110 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 112 may include, for example, a hard disk, magnetic tape, flash drive, or other fixed or removable medium that is read by and written to by the media drive 110. As these examples illustrate, the storage media 112 may include a computer-readable storage medium having stored therein particular computer software or data.

In alternative embodiments, the storage devices 108 may include other similar instrumentalities for allowing computer programs or other instructions or data to be loaded into the computing system 100. Such instrumentalities may include, for example, a removable storage unit 114 and a storage unit interface 116, such as a program cartridge and cartridge interface, a removable memory (for example, a flash memory or other removable memory module) and memory slot, and other removable storage units and interfaces that allow software and data to be transferred from the removable storage unit 114 to the computing system 100.

The computing system 100 may also include a communications interface 118. The communications interface 118 may be used to allow software and data to be transferred between the computing system 100 and external devices. Examples of the communications interface 118 may include a network interface (such as an Ethernet or other NIC card), a communications port (such as for example, a USB port, a micro USB port), Near field Communication (NFC), etc. Software and data transferred via the communications interface 118 are in the form of signals which may be electronic, electromagnetic, optical, or other signals capable of being received by the communications interface 118. These signals are provided to the communications interface 118 via a channel 120. The channel 120 may carry signals and may be implemented using a wireless medium, wire or cable, fiber optics, or other communications medium. Some examples of the channel 120 may include a phone line, a cellular phone link, an RF link, a Bluetooth link, a network interface, a local or wide area network, and other communications channels.

The computing system 100 may further include Input/Output (I/O) devices 122. Examples may include, but are not limited to a display, keypad, microphone, audio speakers, vibrating motor, LED lights, etc. The I/O devices 122 may receive input from a user and also display an output of the computation performed by the processor 102. In this document, the terms "computer program product" and "computer-readable medium" may be used generally to refer to media such as, for example, the memory 106, the storage devices 108, the removable storage unit 114, or signal(s) on the channel 120. These and other forms of computer-readable media may be involved in providing one or more sequences of one or more instructions to the processor 102 for execution. Such instructions, generally referred to as "computer program code" (which may be grouped in the form of computer programs or other groupings), when executed, enable the computing system 100 to perform features or functions of embodiments of the present invention.

In an embodiment where the elements are implemented using software, the software may be stored in a computer-readable medium and loaded into the computing system 100 using, for example, the removable storage unit 114, the media drive 110 or the communications interface 118. The control logic (in this example, software instructions or computer program code), when executed by the processor 102, causes the processor 102 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The present disclosure relates to performing summarization of a text input. The input text comprised of a plurality of paragraphs along with a user-input comprised of one or more tokens is received. The input text is segregated into the plurality of paragraphs, such that each of the plurality of paragraphs includes a plurality of tokens. Thereafter, a plurality of paragraph-vectors are created, such that each of the plurality of paragraph-vectors is representative of a paragraph of the plurality of paragraphs. The plurality of paragraph-vectors are then clustered to generate one or more clusters of paragraph-vectors. A relevant cluster of paragraph-vectors is determined from the one or more clusters of paragraph-vectors, based on a degree of similarity of each cluster of paragraph-vectors with the user input. As will be understood, the relevant cluster of paragraph-vectors is representative of a set of relevant paragraphs from the input text. Further, the set of relevant paragraphs corresponding to the relevant cluster of paragraph-vectors is outputted. Further, a set of relevant token-vectors is identified from the relevant cluster of paragraph-vectors, based on a degree of similarity of each token-vector with the user input, such that the set of relevant token-vectors is representative of a relevant excerpt from the relevant paragraph. The relevant excerpt from the relevant paragraph is then outputted to provide a summary of the input text.

Figure 2:
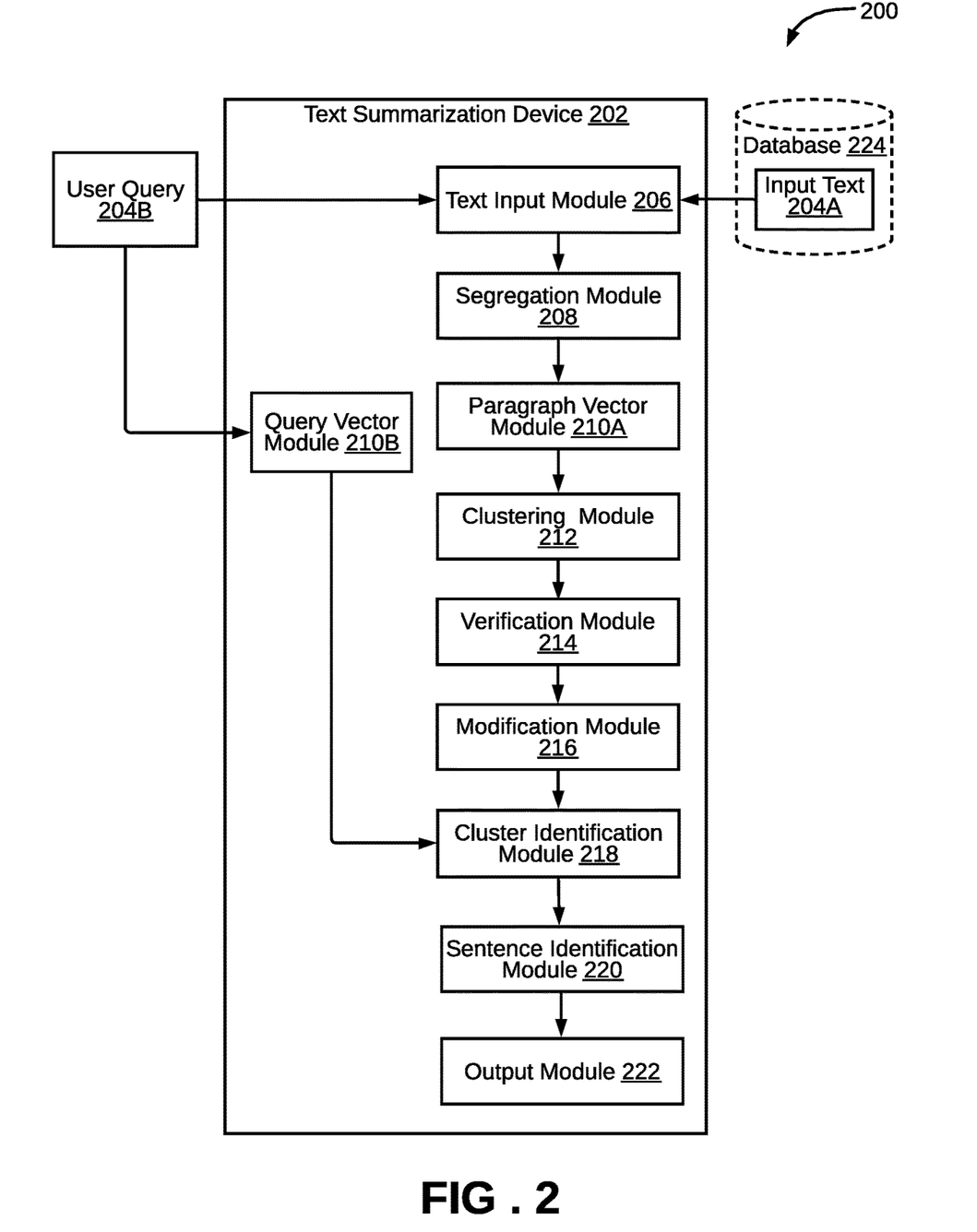
FIG. 2 is a functional block diagram of a system for performing summarization of text, in accordance with an embodiment of the present disclosure.

Referring to FIG. 2, a block diagram of a system 200 for performing summarization of text is illustrated, in accordance with an embodiment of the present disclosure. The system 200 may include a text summarization device 202 that may be configured to summarize an input text 204A. The text summarization device 202 may further include a text input module 206, a segregation module 208, a paragraph vector module 210A, a query vector module 210B, a clustering module 212, a verification module 214, a modification module 216, a cluster identification module 218, a sentence identification module 220, and an output module 222.

The text input module 206 may receive an input text 204A. For example, the input text 204A may be obtained from a database 224. The input text 204A may include a text document, such as MICROSOFT WORD document, or a PDF document, etc. for which the text summarization is to be performed. As such, the input text may include a plurality of paragraphs.

The text input module 206 may further receive a user-query 204B. The user-query 204B may include one or more tokens (i.e., text words). For example, the user-query 204B may include one or more topics based on which the text summarization of the input text 204A is to be performed. By way of an example, the input text 204A may include one or more technical documents of one or more domains such as but not limited to Electrical and Electronics, Mechanical, Civil, Bioengineering, etc. Further, the user-query 204B may include a topic "Bioengineering". A text summarization, therefore, is required to performed on the one or more technical documents to generate a summary focused on "Bioengineering".

The segregation module 208 may be configured to segregate the input text 204A into its plurality of paragraphs. As it will be appreciated, each of the plurality of paragraphs may include a plurality of tokens (i.e., text words). Upon segregating, the plurality of paragraphs may be stored in an object database (not shown in the FIG. 2). Further, in some embodiments, the plurality of paragraphs may be mapped onto a dictionary (with an identification (ID)) and then stored in the object database.

The paragraph vector module 210A may be configured to create a plurality of paragraph-vectors, such that each of the plurality of paragraph-vectors is representative of a paragraph of the plurality of paragraphs. As will be appreciated, a vector is an algebraic expression (i.e., numbers) of a component that are used to perform algorithmic operations (for example, a Python Programming) on the components. In some embodiments, the plurality of paragraph-vectors may be created corresponding to the plurality of paragraphs using at least one of a "Word2vec" model or a "Global Vectors (GloVe)" model. In some embodiments, the "Word2vec" model may create vector representation of each word of dimension (1,300) in one paragraph and then take the mean to create a vector which represents the paragraph of dimension (1,300). To this end, the paragraph vector module 210A may create a plurality of token-vectors corresponding to the plurality of tokens belonging to each of the plurality of paragraphs. Further, the paragraph vector module 210A may create a paragraph-vector using the plurality of token-vectors based on determining a mean of the plurality of token-vectors.

It may be noted that, in some alternate embodiments, sentence-vectors may be created corresponding to the sentences of the input text 204A. For example, the sentence-vectors may be created using a BERT-sentence transformers. Therefore, a plurality of sentence-vectors may be used for additionally or alternatively to the paragraph-vectors for subsequent processing.

The query vector module 210B may create one or more query-vectors for the user-query 204B. In particular, the query vector module 210B may create query-vectors corresponding to the one or more tokens of the user-query 204B. It should be further noted that similar to the paragraph vector module 210A, the query vector module 210B may create the query-vectors using the "Word2vec" model or the "GloVe" model.

The clustering module 212 may be configured to cluster the plurality of paragraph-vectors to generate one or more clusters of paragraph-vectors. The clustering may be performed based on a clustering criterion. In some embodiments, the clustering criterion may be based on content similarity or context similarity. In other words, the paragraphs having similar content (i.e., similar matching words) or context (i.e., similar contextual meaning) may be clustered together, by way of clustering of the plurality of paragraph-vectors. In some embodiments, the clustering may be performed using at least one of a "Hierarchical" clustering model, or a "K-Means" clustering model.

The verification module 214 may be configured to verify the number of clusters of paragraph-vectors that are generated by the clustering module 212. As mentioned above, the clustering module 212 may cluster the paragraph-vectors based on the content similarity or context similarity. A threshold may be predefined to qualify a particular content or context for an individual cluster. As will be appreciated, if the threshold is set low, an excessive number of clusters may be generated by the clustering module 212 with some of the clusters based on relatively insignificant content or context. Such, clustering may yield incorrect summarization results.

To this end, the verification module 214 may double-check the number of clusters that are created by the clustering module 212 using the above-mentioned example clustering models (i.e., "Hierarchical" clustering model, or a "K-Means" clustering model). In order to verify the number of clusters of paragraph-vectors generated, the verification module 214 may determine an optimum number of clusters of paragraph-vectors for the input text based on at least one of: a silhouette analysis, an elbow method, or a dendrogram. It may be noted that any other technique may be used as well for determining the optimum number of clusters of paragraph-vectors. It may be further noted that the output from the above techniques is a number, i.e., the optimum number of clusters of paragraph-vectors.

The verification module 214 may further compare the number of clusters of paragraph-vectors generated with the optimum number of clusters of paragraph-vectors. As such, based on the comparison, the verification module 214 may verify accuracy of number of clusters generated by the clustering module 212. As mentioned above, the clustering module 212 may generate an excessive number of clusters based on relatively insignificant content or context, which may further lead to incorrect summarization results. This may be due to a faulty (e.g., low) clustering threshold.

Therefore, if the number of clusters of paragraph-vectors generated is more than the optimum number of clusters of paragraph-vectors, it may be necessary to modify the clustering threshold. To this end, the modification module 216 may modify the clustering threshold, when the number of clusters of paragraph-vectors generated is more than the optimum number of clusters of paragraph-vectors. In other words, the modification module 216 may allow a user to modify the clustering threshold. As such, the modification module 216 may allow to iteratively re-cluster the plurality of paragraph-vectors to generate one or more clusters of paragraph-vectors, until the number of clusters of paragraph-vectors generated is no more than the optimum number of clusters of paragraph-vectors.

In an example scenario, the clustering module 212 may generate seven clusters. However, the optimum number of clusters of the paragraph-vectors as determined by the verification module 214 may be four. In this scenario, the modification module 216 may allow to iteratively modify the clustering threshold, and re-cluster the plurality of paragraph-vectors until the number of clusters of paragraph-vectors generated by the clustering module 212 is equal to or less than four.

The cluster identification module 218 may determine a relevant cluster of paragraph-vectors from the one or more clusters of paragraph-vectors generated by the clustering module 212, based on a degree of similarity of each cluster of paragraph-vectors with the query-vector (representative of the user-query 204B). It may be noted that the relevant cluster of paragraph-vectors is representative of a set of relevant paragraphs from the input text. In some embodiments, the degree of similarity of each cluster of paragraph-vectors with the query-vector may be determined based on a first step of cosine similarity analysis. As it will be discussed in the subsequent sections of this disclosure, the cosine similarity analysis may be performed in two steps—the first step of cosine similarity analysis may be performed to determine degree of similarity of each cluster of paragraph-vectors with the user-query, and a second step of cosine similarity analysis may be performed to determine degree of similarity of each token-vector with the user-query. In other words, the cluster identification module 218 may determine the relevant cluster(s) of paragraph-vectors from the one or more clusters of paragraph-vectors based on relevance (i.e., similarity) of the paragraphs with the query-vector (representative of the user-query 204B). It may be further noted that the cluster identification module 218 may determine more than one relevant cluster of paragraph-vectors from the one or more clusters of paragraph-vectors. The set of relevant paragraphs corresponding to the relevant cluster of paragraph-vectors may be provided as an output (i.e., summary) to the user, by the output module 222.

In some alternate embodiments, instead of providing the relevant paragraph(s) as an output, a more concise summary may be provided. For example, this concise summary may include one or more relevant sentences (from the relevant paragraph). To this end, the sentence identification module 220 may identify a set of relevant token-vectors from the relevant cluster of paragraph-vectors, based on a degree of similarity of each token-vector with the query-vector. The set of relevant token-vectors may be representative of a relevant excerpt, for example a relevant text sentence (from the relevant paragraph). In some embodiments, the degree of similarity of each token-vector with the query-vector may be determined based on the second step of cosine similarity analysis. This relevant excerpt/sentence may be be provided an output.

Figure 3:
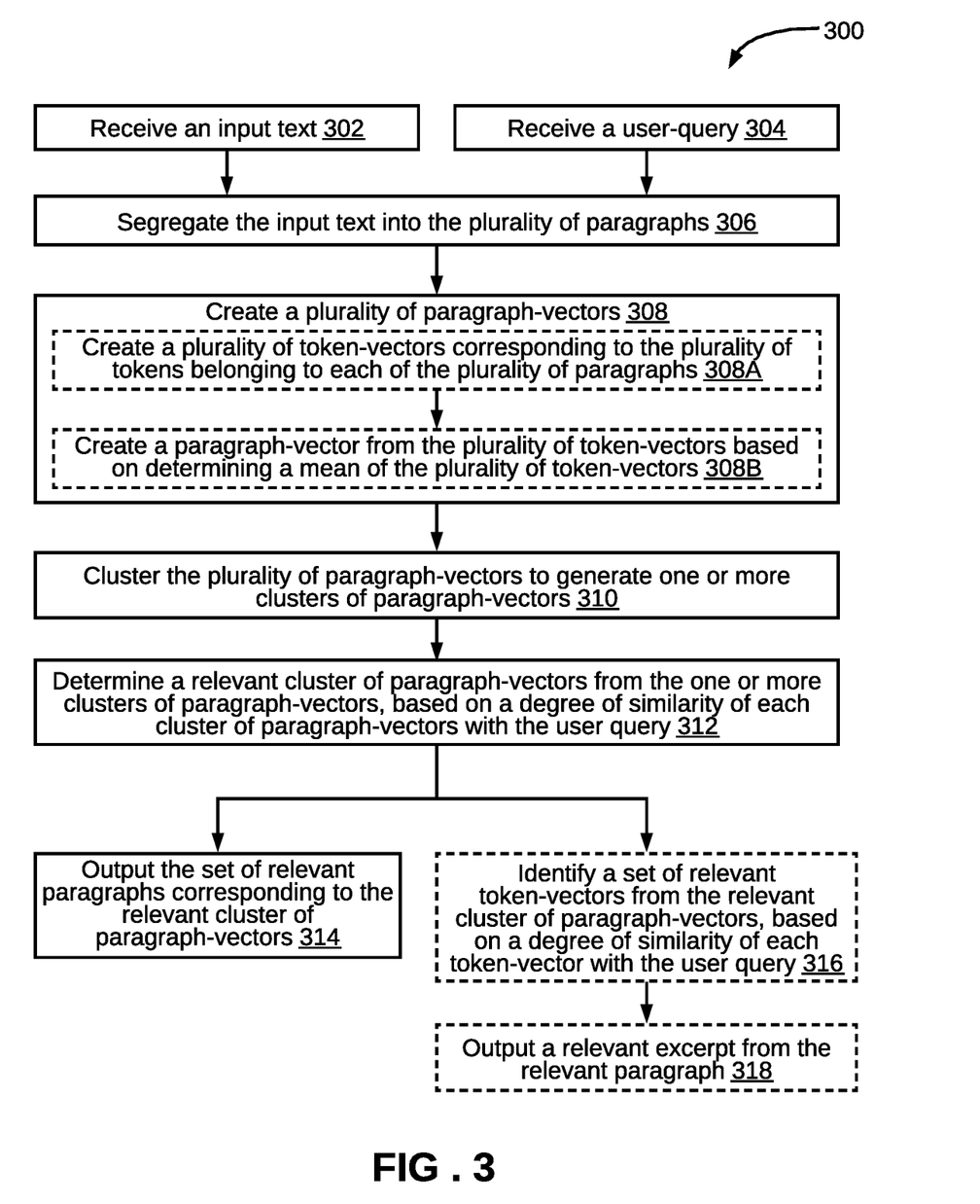
FIG. 3 illustrates a flowchart of a method of performing summarization of text, in accordance with an embodiment of the present disclosure.

Referring now to FIG. 3, a flowchart of a method 300 of performing summarization of input text is illustrated, in accordance with an embodiment of the present disclosure. For example, the method 300 may be performed by the text summarization device 202.

At step 302, the input text 204A may be received. The input text 204A may include a plurality of paragraphs. Simultaneously, at step 304, the user-query 204B may be received. The user-query 204B may include one or more tokens based on which the input text is to be summarized. In other words, a user may feed the user-query 204B to the text input module 206. The user-query 204B may be any natural language words or sentences that are fed by the user. At step 306, the input text 204A may be segregated into the plurality of paragraphs. It may be noted that each of the plurality of paragraphs may include a plurality of tokens. It may be further noted that in order to segregate the input text into the plurality of paragraphs, one or more text processing techniques to identify paragraphs may be used. For example, the plurality of paragraphs may be identified by image analysis to distinguish the paragraphs from one another.

At step 308, a plurality of paragraph-vectors may be created. Each of the plurality of paragraph-vectors is representative of a paragraph of the plurality of paragraphs. For example, the plurality of paragraph-vectors may be created corresponding to the plurality of paragraphs of the input text 204A using a "Word2vec" model or a "Global Vectors (GloVe)" model. In particular, a paragraph-vector may be created via steps 308A-308B. At step 308A, a plurality of token-vectors corresponding to the plurality of tokens belonging to each of the plurality of paragraphs may be created using the "Word2vec" model or the "Global Vectors (GloVe)" model. At step 308B, a paragraph-vector may be created from the plurality of token-vectors based on determining a mean of the plurality of token-vectors.

At step 310, the plurality of paragraph-vectors may be clustered to generate one or more clusters of paragraph-vectors. The clustering may be performed based on a clustering criterion. In some embodiments, the clustering may be based on content similarity or context similarity. The clustering is further explained in conjunction with FIG. 5A.

Figure 5A:
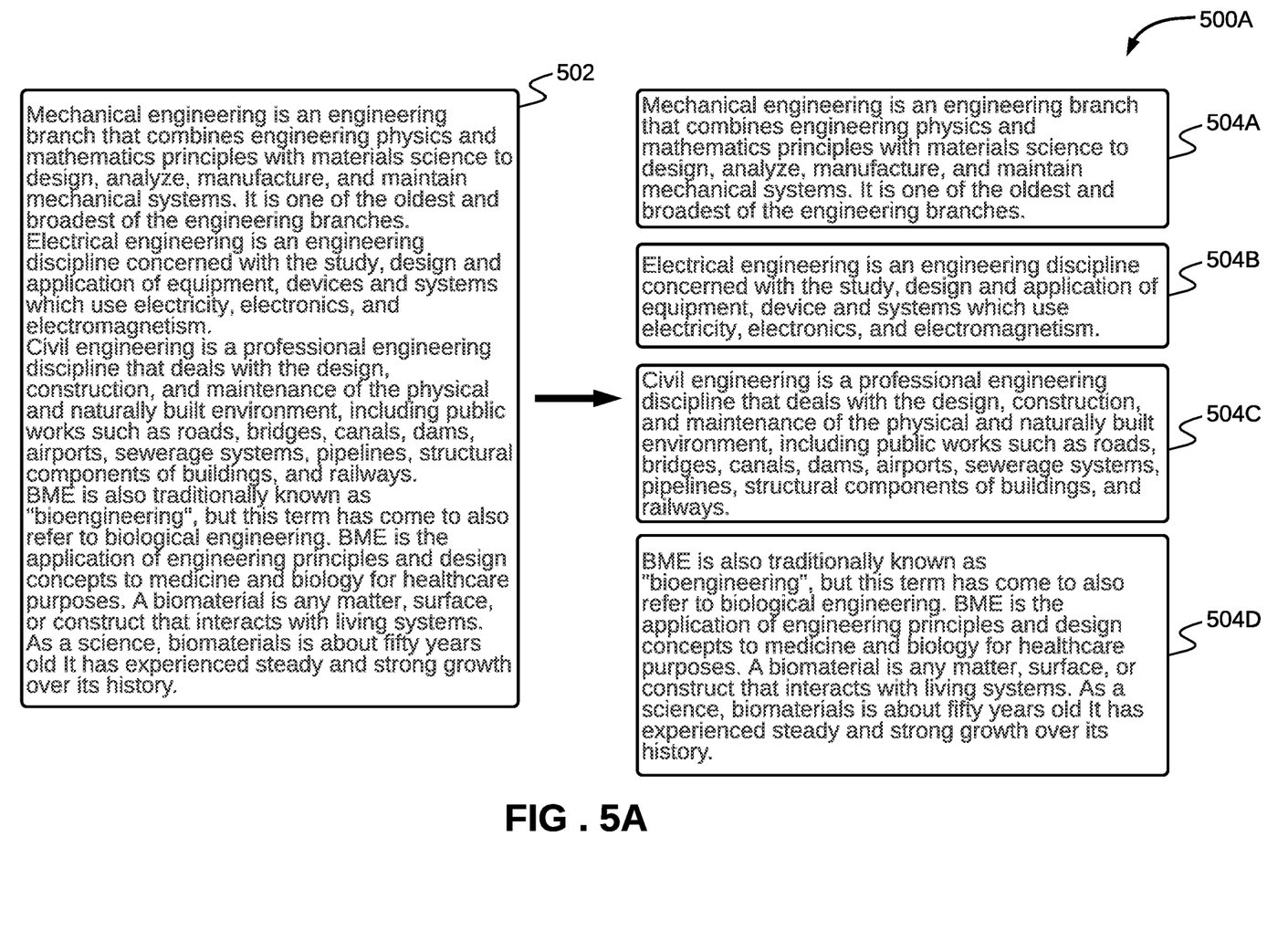
FIG. 5A illustrates a process flow diagram of an example process of clustering a plurality of paragraph-vectors to generate one or more clusters of paragraph-vectors, in accordance with an embodiment of the present disclosure.

Referring now to FIG. 5A, a process flow diagram of an exemplary process 500A of clustering a plurality of paragraph-vectors to generate one or more clusters of paragraph-vectors is illustrated, in accordance with an embodiment of the present disclosure. As illustrated, in the FIG. 5A, an input text 502 (corresponding to the input text 204A) may be received. The input text 502 may include text related to multiple technical topics, for example, "Mechanical Engineering", "Electrical Engineering", "Civil Engineering", "Bioengineering (BME)", etc. Further, the input text 502 may include one or more paragraphs on each of the topics (i.e., having similar content). A clustering may be performed on the input text 502 to generate clusters of paragraph-vectors (representative of sets of paragraphs 504A, 504B, 504C, 504D) from the input text 502. In particular, performing the clustering may include segregating the input text 502 into a plurality of paragraphs, creating a plurality of paragraph-vectors (each of the plurality of paragraph-vectors being representative of a paragraph of the plurality of paragraphs), and clustering the plurality of paragraph-vectors to generate one or more clusters of paragraph-vectors. It should be noted that each set of paragraphs (i.e., each of 504A, 504B, 504C, 504D) may include one or more interrelated paragraphs. As mentioned above, the clustering may be performed based on "Hierarchical" clustering or "K-Means" clustering. The one or more clusters of paragraph-vectors represent the of paragraphs 504A, 504B, 504C, 504D.

Returning to FIG. 3, in some embodiments, once the plurality of paragraph-vectors are clustered to generate one or more clusters of paragraph-vectors, the number of clusters of paragraph-vectors generated may be verified. Further, based on the verification, plurality of paragraph-vectors may be (iteratively) re-clustered. This is further explained in detail in conjunction with FIG. 4.

Figure 4:
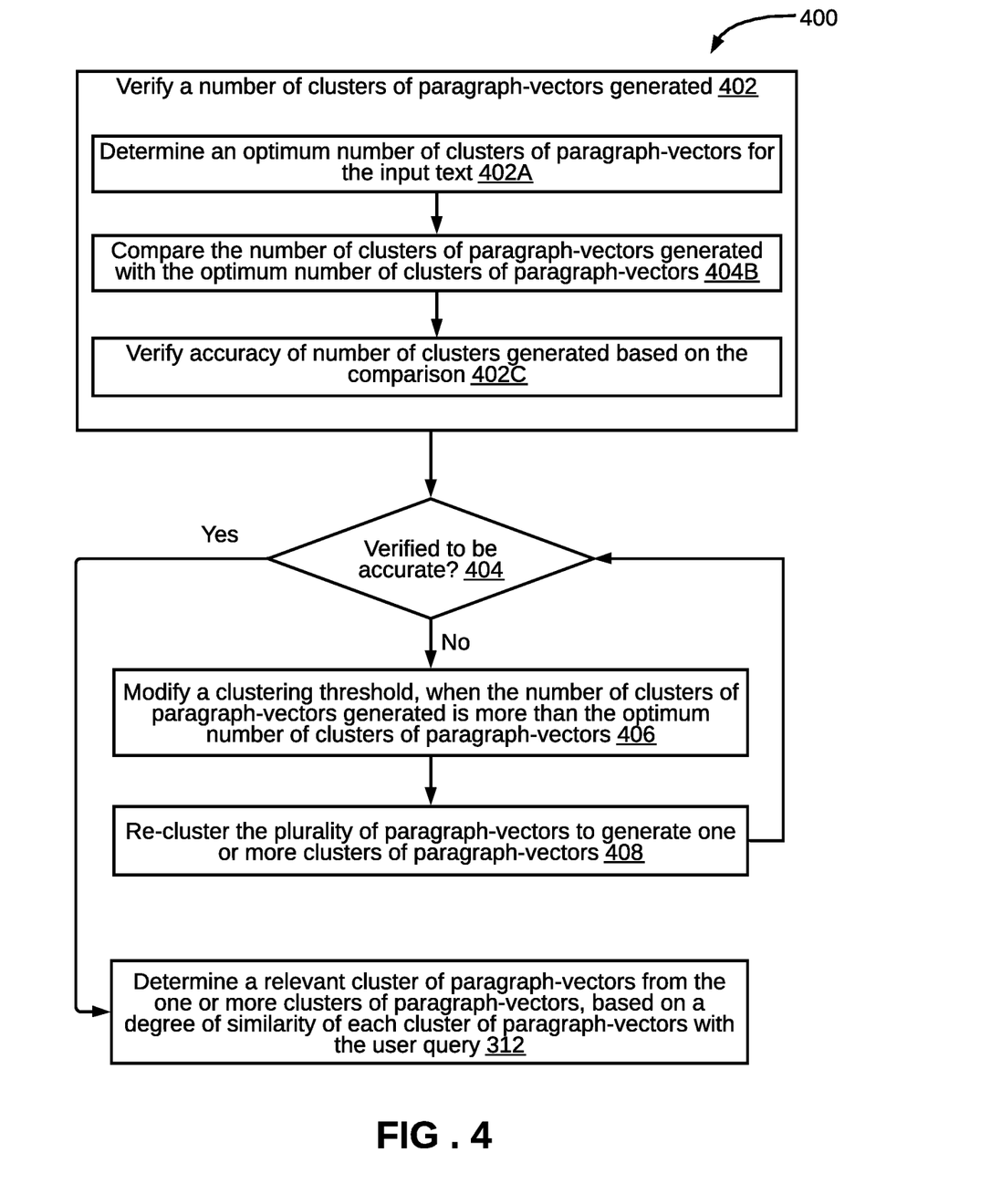
FIG. 4 illustrates a flowchart of a method of verifying and re-clustering paragraph-vectors, in accordance with an embodiment of the present disclosure.

Referring now to FIG. 4, a flowchart of a method 400 of verifying and re-clustering the paragraph-vectors is illustrated, in accordance with an embodiment of the present disclosure. At step 402, a number of clusters of paragraph-vectors generated may be verified. In order to verify the number of clusters of paragraph-vectors generated, steps 402A-402C may be performed. At step 402A, an optimum number of clusters of paragraph-vectors for the input text may be determined. The optimum number may be determined based on one of: a silhouette analysis, an elbow method, or a dendrogram. At step 402B, the number of clusters of paragraph-vectors generated may be compared with the optimum number of clusters of paragraph-vectors. At step 402C, accuracy of number of clusters generated may be verified based on the comparison. For example, the number of clusters generated may be verified to be accurate if the number is near about the optimum number.

At step 404, a check may be performed to determine if the number of clusters generated is verified to be accurate or not. If the number of clusters generated is verified to be accurate, the method 400 may proceed to step 312 ("Yes" path). At step 312 (as will be explained in conjunction with method 300), a relevant cluster of paragraph-vectors may be identified from the one or more clusters of paragraph-vectors, based on a degree of similarity of each cluster of paragraph-vectors with the user query. However, if at step 404, the number of clusters generated is not verified to be accurate, the method 400 may proceed to step 406 ("No" path). At step 406, the clustering threshold may be modified. For example, the clustering threshold may be modified when the number of clusters of paragraph-vectors generated is more than the optimum number of clusters of paragraph-vectors. At step 408, the plurality of paragraph-vectors may be re-clustered to generate one or more clusters of paragraph-vectors based on the modified clustering threshold. Thereafter, the method 400 may once again proceed to step 404, and the process may be repeated.

It should be noted that the above process may be repeated, i.e., the plurality of paragraph-vectors may be (iteratively) re-clustered until the number of clusters of paragraph-vectors generated is no more than the optimum number of clusters of paragraph-vectors (i.e., verified to be accurate). Once the number of clusters generated is verified to be accurate at step 404, the method 400 may finally proceed to step 312.

Returning to FIG. 3, as mentioned above, at step 312, a relevant cluster of paragraph-vectors may be determined from the one or more clusters of paragraph-vectors. The relevant cluster of paragraph-vectors may be determined based on a degree of similarity of each cluster of paragraph-vectors with a query-vector (representative of user-query). As will be understood, the relevant cluster of paragraph-vectors is representative of a set of relevant paragraphs from the input text 204A. Further, the degree of similarity of each cluster of paragraph-vectors with the query-vector is determined based on the first step of cosine similarity analysis. This is further explained in conjunction with FIG. 5B.

Figure 5B:
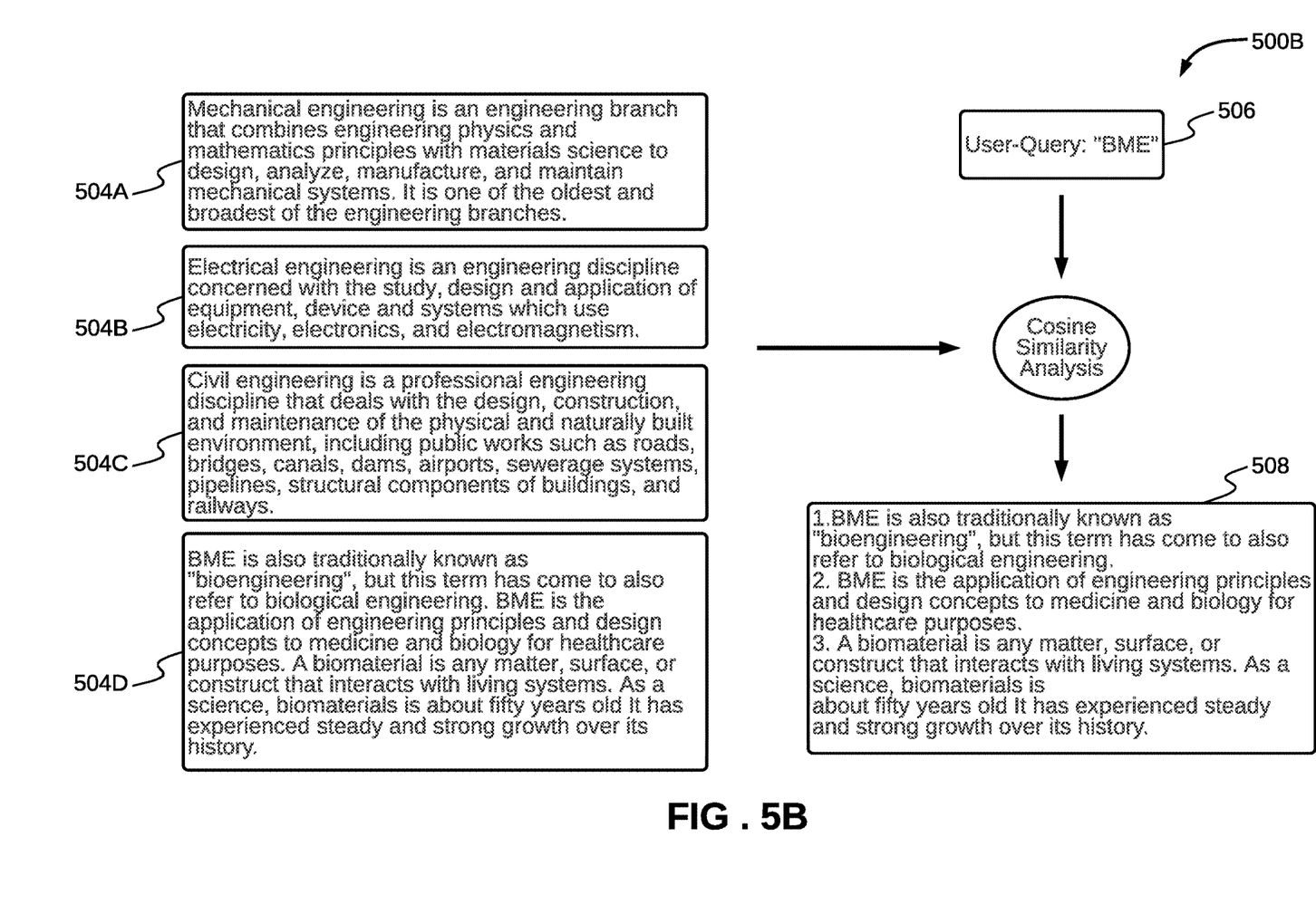
FIG. 5B illustrates a process flow diagram of an example process of identifying a relevant cluster of paragraph-vectors from the plurality of paragraph-vectors, in accordance with an embodiment of the present disclosure.

Referring now to FIG. 5B, a process flow diagram of an exemplary process 500B of identifying relevant cluster of paragraph-vectors from the plurality of paragraph-vectors is illustrated, in accordance with an embodiment of the present disclosure. The clusters of paragraph-vector (representative of paragraphs 504A, 504B, 504C, 504D) may be fed into cluster identification module 218 which may apply the first step of cosine similarity between the plurality of paragraph-vectors and a query-vector (representative of a user-query 506). For example, as shown in the FIG. 5B, the user-query 506 is "Bioengineering". A degree of similarity of each cluster of paragraph-vectors (representative of paragraphs 504A, 504B, 504C, 504D) with the query-vector (representative of the user-query 506) is determined based on the first step of cosine similarity analysis. The first step of cosine similarity analysis may be performed to determine the most relevant cluster with respect to the user-query. As such, a cluster of paragraph-vectors with maximum similarity with the query-vector is identified. Therefore, in the example case as shown in the FIG. 5B, the cluster of paragraph-vectors representative of paragraph 504D may be identified. As it can be seen, the paragraph 504D includes one or more sentences relevant (i.e., related to the topic "Bioengineering" or "BME") to the user-query 506.

Returning once again to FIG. 3, at step 314, a set of relevant paragraphs corresponding to the relevant cluster of paragraph-vectors may be outputted as summary. As such, in the above example, a relevant paragraph 508 (corresponding to paragraph 504D) may be provided as output and displayed on a screen. It should be noted that in alternate examples, the output may include a set of paragraphs and not a single paragraph.

In some embodiments, additionally, instead of providing the relevant paragraph(s) as an output, a more concise summary may be provided. For example, this concise summary may include one or more relevant sentences. To this end, at step 316, a set of relevant token-vectors may be identified from the relevant cluster of paragraph-vectors, based on a degree of similarity of each token-vector with the query-vector. The set of relevant token-vectors may be representative of a relevant excerpt, for example a relevant text sentence from the relevant paragraph. In some embodiments, the degree of similarity of each token-vector with the user-query may be determined based on the second step of cosine similarity analysis. As step, 318, the relevant excerpt from the relevant paragraph may be outputted and displayed on the screen. This is further explained in conjunction with FIG. 5C.

Figure 5C:
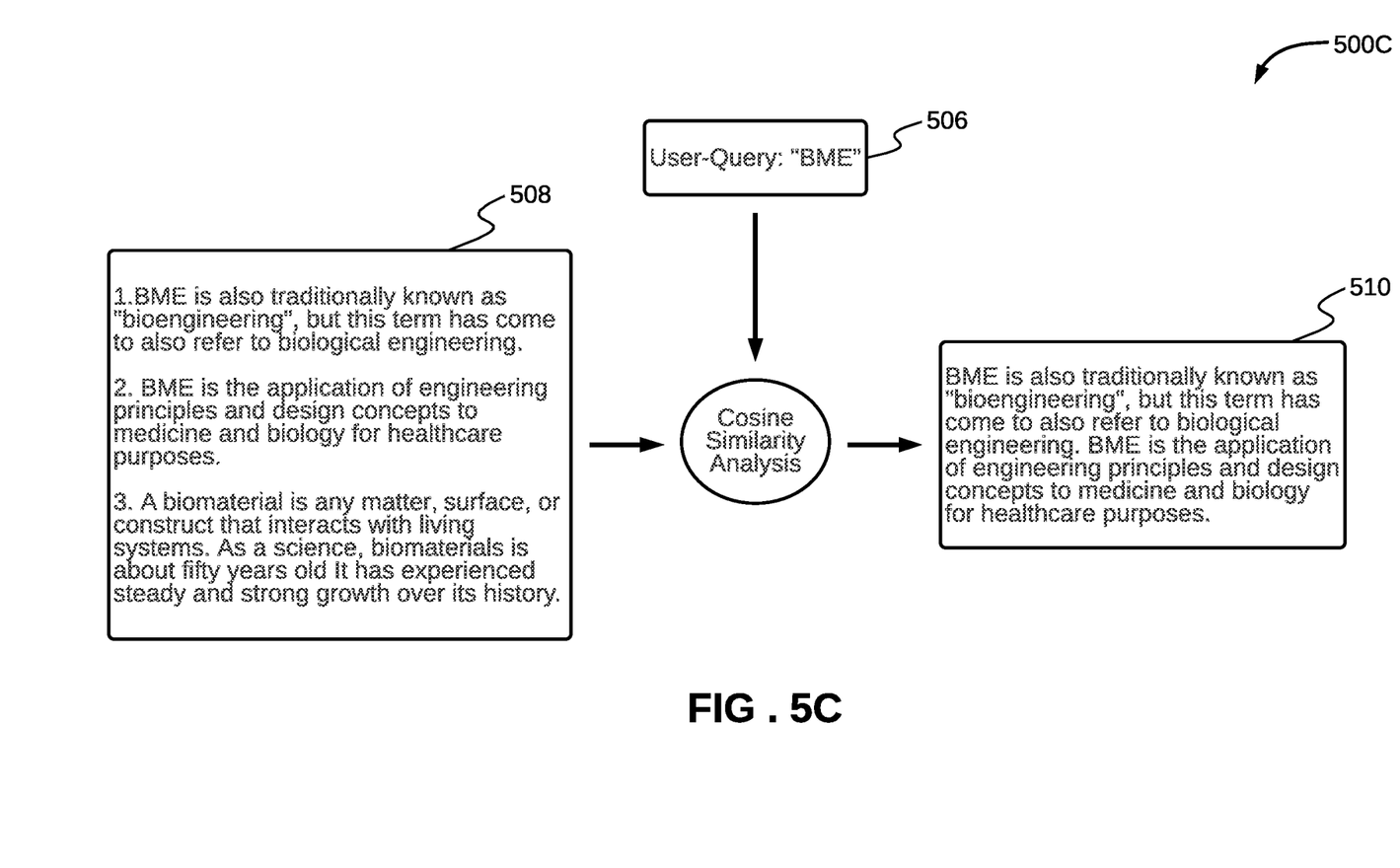
FIG. 5C illustrates a process flow diagram of an example process of generating text summary using the relevant sentences, in accordance with an embodiment of the present disclosure.

Referring now to FIG. 5C, a process diagram of an exemplary process 500C of generating text summary using the relevant sentences is illustrated, in accordance with an embodiment of the present disclosure. Once the relevant paragraph 508 is identified via the process 500B, the sentence identification module 220 may identify one or more relevant sentences 510 from the relevant paragraph 508, based on the second step of cosine similarity analysis. The second step of cosine similarity analysis may be performed to determine the most relevant sentences or most relevant paragraphs from the identified set of relevant paragraphs with respect to the user-query. As shown in the FIG. 5C, the second step of cosine similarity analysis is performed between the relevant cluster of paragraph-vectors (representative of paragraph 508) and the query-token (representative of the user-query 506 "BME"). Based on the cosine similarity matching, the relevant sentence 510 provided below is identified and extracted:

"BME is also traditionally known as "bioengineering", but this term has come to also refer to biological engineering. BME is the application of engineering principles and design concepts to medicine and biology for healthcare purposes."

These above relevant sentence(s) 510 may then be outputted as the summary of the input text 502.

The present disclosure discusses one or more techniques for semantic-based dynamic summarization of the input text based on input keywords (user-query) using the concept of clustering. For example, the above techniques may use "Hierarchical" clustering, or "K-means" clustering, or any other clustering techniques known in the art for clustering one or more paragraphs. Further, the above techniques provide for verification of the clustering results by double checking using silhouette analysis, or an elbow method, or a dendrogram. This ensures accuracy of clustering and therefore of the summarization. The above techniques provide topic-wise segregation of paragraphs of the input text. Moreover, the above techniques provide a unique solution of dynamic summarization of the input text by performing cosine similarity between paragraph-vectors and the query-vector. The above techniques therefore provide for an effective, time-efficient, and cost-efficient solution for retrieving relevant content from a plurality of documents.

It is intended that the disclosure and examples be considered as exemplary only, with a true scope and spirit of disclosed embodiments being indicated by the following claims.

What is claimed is:

1. A method of performing summarization of text, the method comprising:
   receiving, by a text summarization device, an input text, wherein the input text comprises a plurality of paragraphs;
   receiving, by the text summarization device, a user-query comprising one or more tokens;
   segregating, by the text summarization device, the input text into the plurality of paragraphs, wherein each of the plurality of paragraphs comprises a plurality of tokens;
   creating, by the text summarization device, a plurality of paragraph-vectors, wherein each of the plurality of paragraph-vectors is representative of a paragraph of the plurality of paragraphs;
   clustering, by the text summarization device, the plurality of paragraph-vectors to generate one or more clusters of paragraph-vectors;
   determining, by the text summarization device, a relevant cluster of paragraph-vectors from the one or more clusters of paragraph-vectors by iteratively re-clustering the plurality of paragraph-vectors, based on an optimum number of clusters of paragraph-vectors and a degree of similarity of each cluster of paragraph-vectors with the user query using a first cosine similarity analysis, wherein the relevant cluster of paragraph-vectors is representative of a set of relevant paragraphs from the input text;
   identifying, by the text summarization device, a set of relevant token-vectors from the relevant cluster of paragraph-vectors, based on a degree of similarity of each token-vector with the user query using a second cosine similarity analysis, wherein the set of relevant token-vectors is representative of a relevant excerpt from the relevant paragraphs; and
   outputting, by the text summarization device, the set of relevant paragraphs corresponding to the relevant cluster of paragraph-vectors and the relevant excerpt from the relevant paragraphs.

2. The method of claim 1, wherein creating a paragraph-vector comprises:
   creating a plurality of token-vectors corresponding to the plurality of tokens belonging to each of the plurality of paragraphs; and
   creating a paragraph-vector from the plurality of token-vectors based on determining a mean of the plurality of token-vectors.

3. The method of claim 2, wherein the plurality of token-vectors is created corresponding to the plurality of tokens using at least one of a Word2vec model or a Global Vectors (GloVe) model.

4. The method of claim 1, wherein the clustering is performed based on at least one of a hierarchical clustering model or a K-Means clustering model.

5. The method of claim 1 comprising:
   verifying a number of clusters of paragraph-vectors generated.

6. The method of claim 5, wherein verifying the number of clusters of paragraph-vectors generated comprises:
   determining an optimum number of clusters of paragraph-vectors for the input text based on one of: a silhouette analysis, an elbow method, or a dendrogram;
   comparing the number of clusters of paragraph-vectors generated with the optimum number of clusters of paragraph-vectors; and
   verifying the number of clusters generated based on the comparison.

7. The method of claim 6 comprising:
   modifying a clustering threshold, when the number of clusters of paragraph-vectors generated is more than the optimum number of clusters of paragraph-vectors.

8. A system for performing summarization of text, the system comprising:
   a processor; and
   a memory configured to store a plurality of processor executable instructions, wherein, upon execution by the processor, the plurality of processor executable instructions cause the processor to:
      receive an input text, wherein the input text comprises a plurality of paragraphs;
      receive a user-query comprising one or more tokens;
      segregate the input text into the plurality of paragraphs, wherein each of the plurality of paragraphs comprises a plurality of tokens;
      create a plurality of paragraph-vectors, wherein each of the plurality of paragraph-vectors is representative of a paragraph of the plurality of paragraphs;
      cluster the plurality of paragraph-vectors to generate one or more clusters of paragraph-vectors;
      determine a relevant cluster of paragraph-vectors from the one or more clusters of paragraph-vectors by iteratively re-clustering the plurality of paragraph-vectors, based on an optimum number of clusters of paragraph-vectors and a degree of similarity of each cluster of paragraph-vectors with the user query using a first cosine similarity analysis, wherein the relevant cluster of paragraph-vectors is representative of a set of relevant paragraphs from the input text;
      identify a set of relevant token-vectors from the relevant cluster of paragraph-vectors, based on a degree of similarity of each token-vector with the user query using a second cosine similarity analysis, wherein the set of relevant token-vectors is representative of a relevant excerpt from the relevant paragraphs; and
      output the set of relevant paragraphs corresponding to the relevant cluster of paragraph-vectors and the relevant excerpt from the relevant paragraphs.

9. The system of claim 8, wherein creating a paragraph-vector comprises:

creating a plurality of token-vectors corresponding to the plurality of tokens belonging to each of the plurality of paragraphs; and creating a paragraph-vector from the plurality of token-vectors based on determining a mean of the plurality of token-vectors.

10. The system of claim 8, wherein the processor executable instructions, upon execution, cause the processor to:

verify a number of clusters of paragraph-vectors generated, wherein verifying the number of clusters of paragraph-vectors generated comprises:

determining an optimum number of clusters of paragraph-vectors for the input text based on one of: a silhouette analysis, an elbow method, or a dendrogram;

comparing the number of clusters of paragraph-vectors generated with the optimum number of clusters of paragraph-vectors; and verifying the number of clusters generated based on the comparison.

11. The system of claim 10, wherein the processor executable instructions, upon execution, cause the processor to:

modify a clustering threshold, when the number of clusters of paragraph-vectors generated is more than the optimum number of clusters of paragraph-vectors.

12. A non-transitory computer-readable medium storing computer-executable instructions for creating a process plan, the computer-executable instructions configured for:

receiving an input text, wherein the input text comprises a plurality of paragraphs; receiving a user-query comprising one or more tokens;

segregating the input text into the plurality of paragraphs, wherein each of the plurality of paragraphs comprises a plurality of tokens;

creating a plurality of paragraph-vectors, wherein each of the plurality of paragraph-vectors is representative of a paragraph of the plurality of paragraphs;

clustering the plurality of paragraph-vectors to generate one or more clusters of paragraph-vectors;

determining a relevant cluster of paragraph-vectors from the one or more clusters of paragraph-vectors by iteratively re-clustering the plurality of paragraph-vectors, based on an optimum number of clusters of paragraph-vectors and a degree of similarity of each cluster of paragraph-vectors with the user query using a first cosine similarity analysis, wherein the relevant cluster of paragraph-vectors is representative of a set of relevant paragraphs from the input text;

identify a set of relevant token-vectors from the relevant cluster of paragraph-vectors, based on a degree of similarity of each token-vector with the user query using a second cosine similarity analysis, wherein the set of relevant token-vectors is representative of a relevant excerpt from the relevant paragraphs; and outputting the set of relevant paragraphs corresponding to the relevant cluster of paragraph-vectors and the relevant excerpt from the relevant paragraphs.

13. The non-transitory computer-readable medium of claim 12, wherein creating a paragraph-vector comprises:

creating a plurality of token-vectors corresponding to the plurality of tokens belonging to each of the plurality of paragraphs; and creating a paragraph-vector from the plurality of token-vectors based on determining a mean of the plurality of token-vectors.

14. The non-transitory computer-readable medium of claim 12, wherein the computer-executable instructions further configured for:

verifying a number of clusters of paragraph-vectors generated, wherein verifying the number of clusters of paragraph-vectors generated comprises:

determining an optimum number of clusters of paragraph-vectors for the input text based on one of: a silhouette analysis, an elbow method, or a dendrogram;

comparing the number of clusters of paragraph-vectors generated with the optimum number of clusters of paragraph-vectors; and verifying the number of clusters generated based on the comparison.

15. The non-transitory computer-readable medium of claim 14, wherein the computer-executable instructions further configured for:

modifying a clustering threshold, when the number of clusters of paragraph-vectors generated is more than the optimum number of clusters of paragraph-vectors.

* * * * *